(12) United States Patent
Moriya et al.

(10) Patent No.: US 7,207,316 B2
(45) Date of Patent: Apr. 24, 2007

(54) CONTROL APPARATUS AND CONTROL METHOD FOR INTERNAL COMBUSTION ENGINE

(75) Inventors: Hidenori Moriya, Susono (JP); Kouhei Miwa, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/562,729

(22) PCT Filed: Jul. 8, 2004

(86) PCT No.: PCT/JP2004/010075

§ 371 (c)(1),
(2), (4) Date: Dec. 30, 2005

(87) PCT Pub. No.: WO2005/003538

PCT Pub. Date: Jan. 13, 2005

(65) Prior Publication Data

US 2006/0150953 A1 Jul. 13, 2006

(30) Foreign Application Priority Data

Jul. 8, 2003 (JP) ............................... 2003-272063

(51) Int. Cl.
*F02M 7/00* (2006.01)
*F02D 41/00* (2006.01)

(52) U.S. Cl. ...................... 123/435; 123/673
(58) Field of Classification Search ................ 123/435, 123/673, 674, 691
See application file for complete search history.

(56) References Cited

U.S. PATENT DOCUMENTS

| | | | | |
|---|---|---|---|---|
| 5,495,830 A | * | 3/1996 | Wu | 123/90.15 |
| 5,786,531 A | * | 7/1998 | Lewis et al. | 73/116 |
| 6,062,025 A | * | 5/2000 | Okada et al. | 60/602 |
| 6,484,694 B2 | * | 11/2002 | Thomas | 123/435 |
| 6,866,024 B2 | * | 3/2005 | Rizzoni et al. | 123/430 |
| 2002/0066445 A1 | * | 6/2002 | Thomas | 123/679 |

FOREIGN PATENT DOCUMENTS

| | | |
|---|---|---|
| JP | A 63-268951 | 11/1988 |
| JP | A 4-81534 | 3/1992 |
| JP | A 4-81557 | 3/1992 |
| JP | A 7-35018 | 2/1995 |

(Continued)

*Primary Examiner*—John T. Kwon
(74) *Attorney, Agent, or Firm*—Oliff & Berridge, PLC

(57) ABSTRACT

An internal combustion engine (1) generates power by burning a mixture of fuel and air in each combustion chamber 3. The internal combustion engine 1 is provided with an in-cylinder pressure sensor (15) disposed in each combustion chamber (3) and an ECU (20). The ECU (20) calculates control parameters at two predetermined points, each of which is a product of an in-cylinder pressure detected by the in-cylinder pressure sensor (15) and a value obtained by exponentiating an in-cylinder volume at the timing of detecting the in-cylinder pressure with predetermined index, as well as calculates a correction value of a fuel injection quantity based upon a difference in the control parameter between the two predetermined points. One of the two predetermined points is set after an intake valve (Vi) opens and before an ignition plug (7) ignites, and the other is set after the ignition plug (7) ignites and before an exhaust valve (Ve) opens.

10 Claims, 4 Drawing Sheets

FOREIGN PATENT DOCUMENTS

| | | |
|---|---|---|
| JP | A 7-42607 | 2/1995 |
| JP | A 2000-110654 | 4/2000 |
| JP | A 2001-110654 | 4/2000 |
| JP | A 2001-152952 | 6/2001 |
| JP | A 2001-207889 | 8/2001 |
| JP | A 2002-47976 | 2/2002 |

* cited by examiner

CONTROL APPARATUS AND CONTROL METHOD FOR INTERNAL COMBUSTION ENGINE

TECHNICAL FIELD

The present invention relates to a control apparatus and a control method for an internal combustion engine which generates power by burning a mixture of fuel and air in a cylinder.

BACKGROUND ART

Conventionally, Patent Document 1 discloses a control apparatus for an internal combustion engine which is provided with an in-cylinder pressure sensor disposed in each cylinder and calculating means for calculating heat production for every unit crank angle per each cylinder during combustion stroke based upon a pressure signal from each in-cylinder pressure sensor. In this control apparatus for the internal combustion engine, a fuel supply quantity (air-fuel ratio in each cylinder) to each cylinder is corrected based upon a calculation result of the calculating means in such a way that the heat production in each cylinder becomes the same level with each other. In addition, Patent Document 2 and Patent Document 3 disclose a control apparatus for an internal combustion engine which determines a changing quantity of in-cylinder pressures between minute crank angles sampled by in-cylinder pressure detecting means as a heat generation rate and then, corrects a fuel supply quantity or an exhaust gas-recirculating quantity to an intake system based upon the determined heat generation rate during a high-load operational region. Further, Patent Document 4 discloses a method which controls ignition timing, an air-fuel ratio, an exhaust gas-rescirculating quantity and fuel injection timing by using a value obtained by subtracting a pressure integral value before a top dead center from a pressure integral value after a top dead center, each pressure integral value being calculated by integrating the in-cylinder pressures.

The above-mentioned conventional control apparatus for the internal combustion engine basically performs integral processing or differential processing of the in-cylinder pressures detected by the in-cylinder pressure detecting means for every minute crank angle. As a result, the calculating loads in the conventional control apparatus become remarkably large and therefore, it is practically difficult to apply the conventional control apparatus to an internal combustion engine for a vehicle, for example.

[Patent Document 1] Japanese Patent Application Laid-Open No. 63-268951

[Patent Document 2] Japanese Patent Application Laid-Open No. 4-81534

[Patent Document 3] Japanese Patent Application Laid-Open No. 4-81557

[Patent Document 4] Japanese Patent Application Laid-Open No. 2001-152952

DISCLOSURE OF THE INVENTION

It is an object of the present invention to provide a control apparatus and a control method for an internal combustion engine with practicality which is capable of simply carrying out high-accurate engine control at low loads.

A control apparatus for an internal combustion engine according to the present invention is characterized in that a control apparatus for an internal combustion engine which generates power by burning a mixture of fuel and air in a cylinder thereof comprises in-cylinder pressure detecting means for detecting an in-cylinder pressure, calculating means for calculating a control parameter based upon the in-cylinder pressure detected by the in-cylinder pressure detecting means and an in-cylinder volume at a timing of detecting the in-cylinder pressure, and control means for setting a predetermined control quantity based upon the control parameter calculated by the calculating means.

It is preferable that the control parameter includes a product of the in-cylinder pressure detected by the in-cylinder pressure detecting means and a value obtained by exponentiating the in-cylinder volume at the timing of detecting the in-cylinder pressure with a predetermined index.

It is preferable that the calculating means calculates the control parameters at two predetermined points, and the control means sets a predetermined control quantity based upon a difference in control parameter between the two predetermined points.

It is preferable that one of the two predetermined points is set as a point after the opening of an intake valve and before the combustion starting of the mixture and the other is set as a point after the combustion starting and before the opening of an exhaust valve.

It is preferable that the control means determines a deviation between the difference in the control parameter calculated previously and the difference in the control parameter calculated at this time on a predetermined condition, and sets a control quantity for correcting an air-fuel ratio of the mixture based upon the determined deviation.

It is preferable that the control means sets a control quantity for correcting an air-fuel ratio of the mixture so that the difference in the control parameter is equal to a target value on a predetermined condition.

A control method for an internal combustion engine according to the present invention is characterized in that a control method for an internal combustion engine which generates power by burning a mixture of fuel and air comprises the steps of:

(a) detecting an in-cylinder pressure;

(b) calculating a control parameter based upon the in-cylinder pressure detected in the step (a) and an in-cylinder volume at a timing of detecting the in-cylinder pressure; and (c) setting a predetermined control quantity based upon the control parameter calculated in the step (b).

It is preferable that the control parameter includes a product of the in-cylinder pressure detected in the step (a) and a value obtained by exponentiating the in-cylinder volume at the timing of detecting the in-cylinder pressure with a predetermined index.

It is preferable that in the step (b), the control parameters are calculated at two predetermined points and in the step (c), a predetermined control quantity is set based upon a difference in the control parameter between the two predetermined points.

It is preferable that one of the two predetermined points is set as a point after the opening of an intake valve and before the combustion starting of the mixture and the other is set as a point after the combustion starting and before the opening of an exhaust valve.

It is preferable that the step (c) includes the step of determining a deviation between the difference in the control parameter calculated previously and the difference in the control parameter calculated at this time on a predetermined condition and the step of setting a control quantity for correcting an air-fuel ratio of the mixture based upon the determined deviation.

The step (c) may include the step of setting a control quantity for correcting an air-fuel ratio of the mixture so that the difference in the control parameter is equal to a target value on a predetermined condition.

BEST MODE FOR CARRYING OUT THE INVENTION

Figure 1:
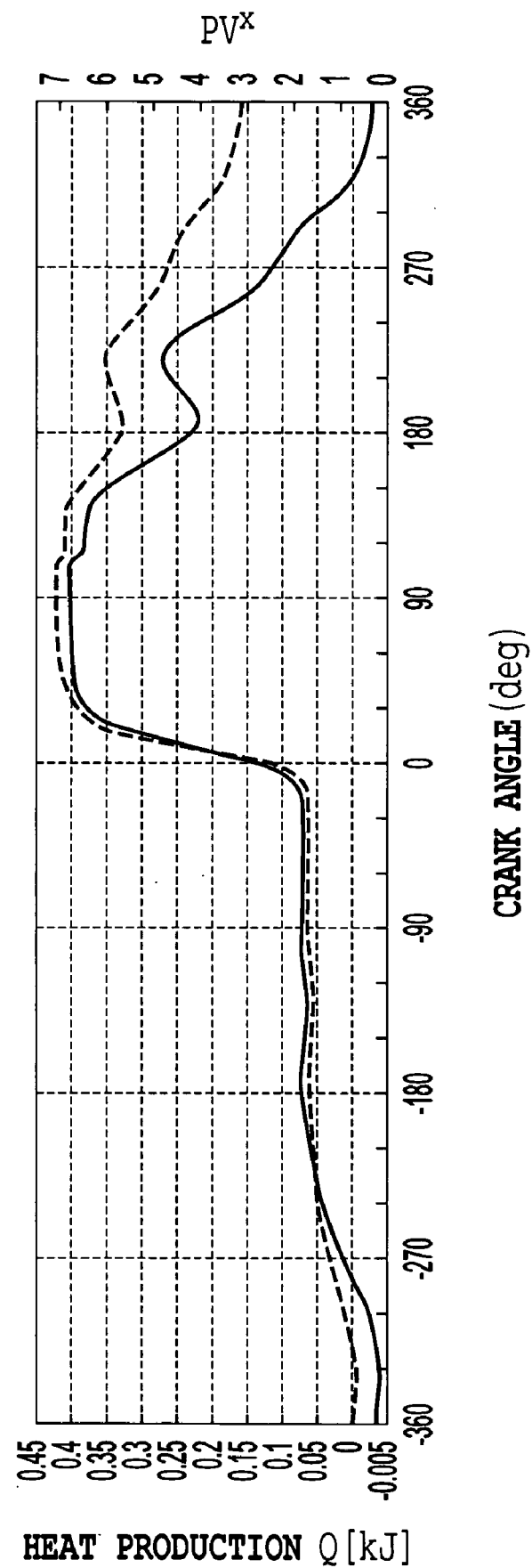
FIG. 1 is a graph showing a correlation between a control parameter $PV^\kappa$ used in the present invention and heat production in a combustion chamber.

The inventors have devoted themselves to the study for enabling an accurate control in an internal combustion engine with reduction of calculation loads thereon. The inventors has resulted in recognizing a control parameter calculated based upon an in-cylinder pressure detected by in-cylinder pressure detecting means and an in-cylinder volume at the timing of detecting the in-cylinder pressure. In more detail, when an in-cylinder pressure detected by in-cylinder pressure detecting means at a crank angle of θ is set as P (θ), an in-cylinder volume at a crank angle of θ is set as V (θ) and a ratio of specific heat is set as κ, the inventors have focused attention on a control parameter P (θ)·$V^\kappa$ (θ) (hereinafter referred to as $PV^\kappa$ properly) obtained as a product of an in-cylinder pressure P(θ) and a value $V^\kappa$ (θ) determined by exponentiating the in-cylinder pressure (θ) with a ratio κ of specific heat (a predetermined index). In addition, the inventors have found out that there is a correlation, as shown in FIG. 1, between a changing pattern of heat production Q in a cylinder for an internal combustion engine to a crank angle and a changing pattern of a control parameter $PV^\kappa$ to a crank angle. It should be noted that in FIG. 1, −360°, 0° and 360° respectively correspond to a top dead center, and −180° and 180° respectively correspond to a bottom dead center.

In FIG. 1, a solid line is produced by plotting control parameters $PV^\kappa$ each of which is a product of an in-cylinder pressure in a model cylinder detected for every predetermined minute crank angle and a value obtained by exponentiating an in-cylinder volume at the timing of detecting the in-cylinder pressure with a predetermined ratio κ of specific heat. In addition, in FIG. 1, a dotted line is produced by calculating and plotting heat production Q in the model cylinder based upon the following formula (1) as $Q=\int dQ$. It should be noted that in any case, κ=1.32 for simplification.

[Number 1]

$$\frac{dQ}{d\theta} = \left\{ \frac{dP}{d\theta}V + k \cdot P \cdot \frac{dV}{d\theta} \right\} \cdot \frac{1}{k-1} \quad (1)$$

As seen from the result shown in FIG. 1, a changing pattern of heat production Q to a crank angle is generally identical (similarity) to a changing pattern of a control pattern $PV^\kappa$ to a crank angle and in particular, it is found out that, after and before the combustion starting (at the spark igniting time in a gasoline engine and at the compression igniting time in a diesel engine) of a mixture in a cylinder (for example, the range of from about −180° to about 135° in FIG. 1), the changing pattern of the heat production Q is extremely identical to the changing pattern of the control parameter $PV^\kappa$. Accordingly, when a predetermined control quantity is set based upon a control parameter $PV^\kappa$ calculated based upon an in-cylinder pressure detected by the in-cylinder pressure detecting means and an in-cylinder volume when detecting the in-cylinder pressure by using a correlation between heat production Q and a control parameter $PV^\kappa$ found out by the inventors, an engine control with high accuracy and good response reflecting heat production Q in a cylinder can be simply performed without requiring calculation processing with high loads.

In this way, in a control apparatus for an internal combustion engine according to the present invention, on a basis of the new realization as described above, a predetermined control quantity is set based upon a control parameter calculated based upon an in-cylinder pressure detected by in-cylinder pressure detecting means for detecting the in-cylinder pressure and an in-cylinder volume at the timing of detecting the in-cylinder pressure, i.e. based upon a control parameter ($PV^\kappa$), which is a product of an in-cylinder pressure detected by the in-cylinder pressure detecting means and a value obtained by exponentiating an in-cylinder volume at the timing of detecting the in-cylinder pressure with a predetermined index. It should be noted that in the present invention, "the setting of a control quantity" includes calculating a control quantity of an air-fuel ratio of a mixture itself or the like and also setting (calculating) a control quantity for correcting the air-fuel ratio of the mixture or the like.

In addition, it is preferable that the control parameters are calculated at two predetermined points and a predetermined control quantity is calculated based upon a difference in the control parameter between the two predetermined points.

As described above, the control parameter $PV^\kappa$ on which the inventors have focused attention reflects heat production Q in a cylinder for an internal combustion engine and a difference in the control parameter $PV^\kappa$ between two predetermined points (for example, two points after and before combustion starting in a cylinder (at the spark ignited time or the compression ignited time)) shows heat production $\int dQ$ in a cylinder between the two points (a value obtained by integrating dQ, for example, in the range of θ1 to θ2 (θ1<θ2), the same hereinafter) and can be calculated at extremely low loads. Accordingly, it is possible to accurately set a predetermined control quantity in accordance with heat production in a cylinder with the calculation loads reduced by a large amount by using a difference in the control parameter between two predetermined points. In this case, it is preferable that one of the two predetermined points is set as a point after the opening of an intake valve and before the combustion starting and the other is set as a point after the combustion starting and before the opening of an exhaust valve.

It is preferable that a deviation between the difference in the control parameter calculated previously and the difference in the control parameter calculated at this time is determined on a predetermined condition and a control quantity for correcting an air-fuel ratio of the mixture is calculated based upon the determined deviation.

Figure 2:
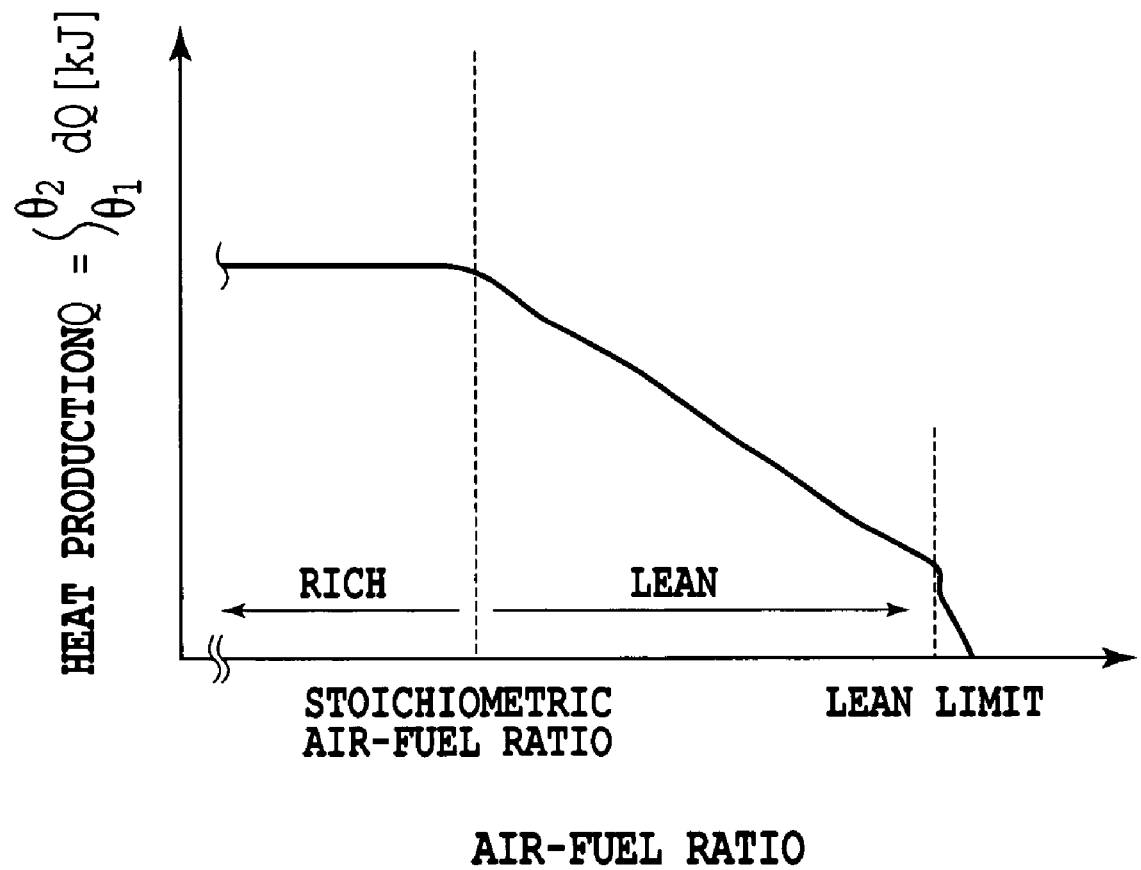
FIG. 2 is a graph showing a correlation between an air-fuel ratio of a mixture in a combustion chamber and heat production between two predetermined points.

The inventors have further focused attention on a relation between heat production in a cylinder and an air-fuel ratio of a mixture in the cylinder. That is, as shown in FIG. 2, in a case an air-fuel ratio of a mixture is smaller than a stoichiometric air-fuel ratio (in a case of a rich region), a change (rate) of heat production $\int dQ$ between the above two predetermined points is extremely slight as compared to a lean region. On the other hand, when an air-fuel ratio of the mixture enters into a lean region thereof exceeding a stoichiometric air-fuel ratio, the heat production $\int dQ$ rapidly reduces generally in proportion to the air-fuel ratio. Therefore, when during the operating of an internal combustion engine, a difference in the control parameter $PV^\kappa$ between two predetermined points, showing heat production $\int dQ$ is determined, as well as a deviation in the difference between the previous calculating value and this time's calculating value in regard to the control parameter $PV^\kappa$ is determined and a control quantity for correcting an air-fuel ratio of a mixture, such as a correction value of a fuel supply quantity is set so that the deviation is maintained in the vicinity of a predetermined value (within a predetermined range), it is possible to always maintain the air-fuel ratio of the mixture in the cylinder accurately in the vicinity of a stoichiometric air-fuel ratio.

Further, preferably a control quantity for correcting an air-fuel ratio of a mixture is calculated so that the difference in the above control parameter becomes equal to a target value on a predetermined condition.

As seen from FIG. 2, when an air-fuel ratio of a mixture in a cylinder is larger than a stoichiometric air-fuel ratio (when the air-fuel ratio becomes lean), the heat production $\int dQ$ between the two predetermined points reduces to a rapidly changing point prior to flameout (a lean limit) generally in proportion to the air-fuel ratio as the air-fuel ratio increases. Accordingly, when a difference in control parameter $PV^\kappa$ between two predetermined points, showing heat production $\int dQ$ is determined and further, a control quantity for correcting an air-fuel ratio of a mixture, such as a correction value of a fuel supply quantity is set so that the difference is equal to a predetermined target value, it is possible to maintain the air-fuel ratio of the mixture in the cylinder accurately in the vicinity of a desired target value (a lean region) larger than a stoichiometric air-fuel ratio.

The best mode for carrying out the present invention will be hereinafter explained in detail with reference to the drawings.

Figure 3:
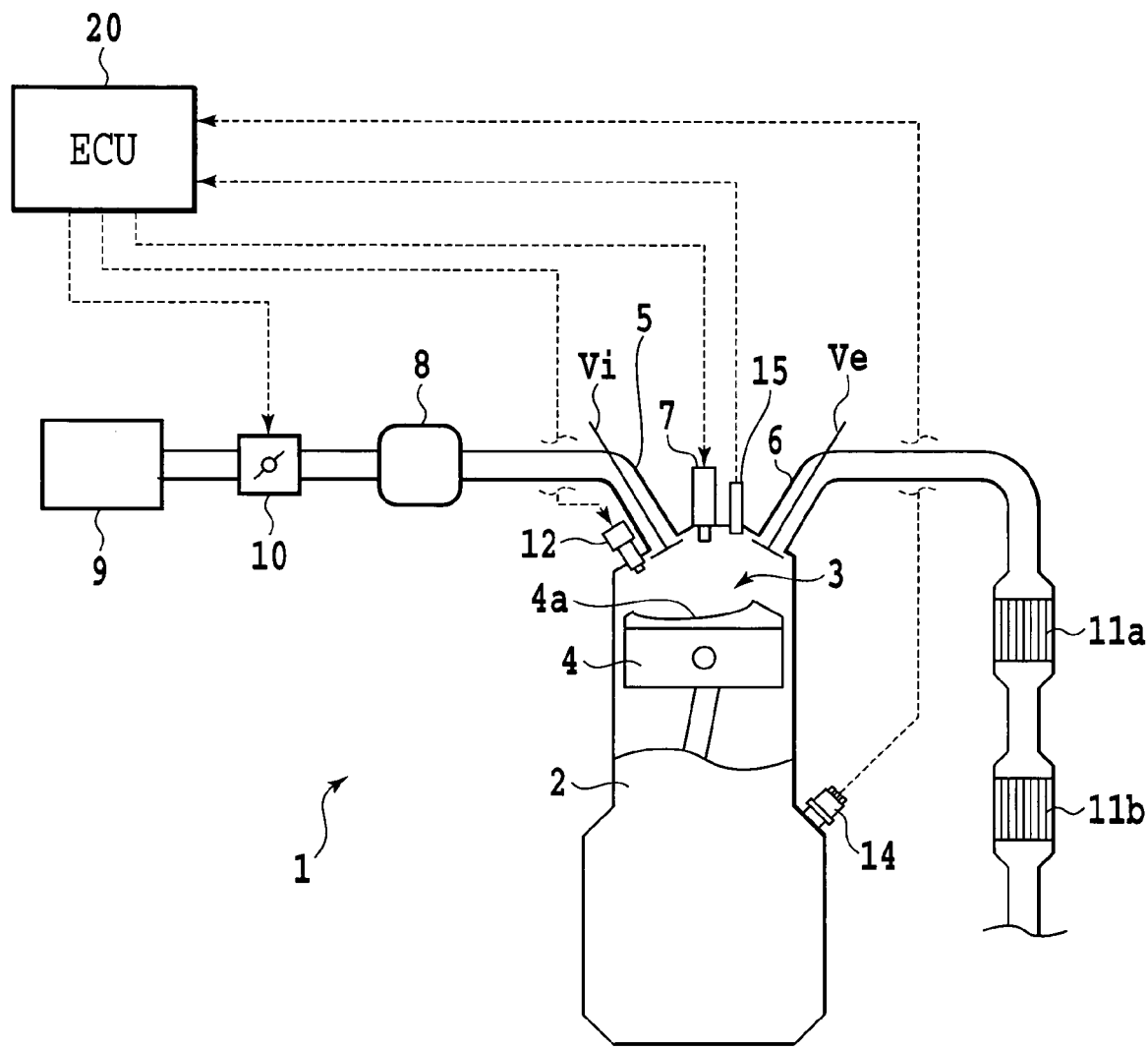
FIG. 3 is a schematic construction view of an internal combustion engine according to the present invention.

FIG. 3 is a schematic construction view showing an internal combustion engine according to the present invention. An internal combustion engine 1 shown in the same figure burns a mixture of fuel and air inside a combustion chamber 3 formed in a cylinder block 2 and reciprocates a piston 4 inside the combustion chamber 3 to produce power. The internal combustion engine 1 is preferably constructed of a multi-cylinder engine and the internal combustion engine 1 in the present embodiment is constructed of, for example, a four-cylinder engine.

An intake port of each combustion chamber 3 is respectively connected to an intake manifold 5 and an exhaust port of each combustion chamber 3 is respectively connected to an exhaust manifold 6. In addition, an intake valve Vi and an exhaust valve Ve are disposed for each chamber 3 in a cylinder head of the internal combustion engine 1. Each intake valve Vi opens/closes the associated intake port and each exhaust valve Ve opens/closes the associated exhaust port. Each intake valve Vi and each exhaust valve Ve are activated by, for example, a valve operating mechanism (not shown) including a variable valve timing function. Further, the internal combustion engine 1 is provided with ignition plugs 7 each of which corresponds to the number of the cylinders and the ignition plug 7 is disposed in the cylinder head for exposure to the associated combustion chamber 3.

The intake manifold 5 is, as shown in FIG. 3, connected to a surge tank 8. An air supply line L1 is connected to the surge tank 8 and is connected to an air inlet (not shown) via an air cleaner 9. A throttle valve 10 (electronically controlled throttle valve in the present embodiment) is incorporated in the halfway of the air supply line L1 (between the surge tank 8 and the air cleaner 9). On the other hand, a pre-catalyst device 11a including a three-way catalyst and a post-catalyst device 11b including NOx occlusion reduction catalyst are, as shown in FIG. 3, connected to the exhaust manifold 6.

Further, the internal combustion engine 1 is provided with a plurality of injectors 12, each of which is, as shown in FIG. 3, disposed in the cylinder head for exposure to the associated combustion chamber 3. And each piston 4 of the internal combustion engine 1 is constructed in a deep-dish top shape, and the upper face thereof is provided with a concave portion 4a. In addition, fuel such as gasoline is directly injected from each injector 12 toward the concave portion 4a of the piston 4 inside each combustion chamber 3 in a state air is aspired into each combustion chamber 3 in the internal combustion engine 1. As a result, in the internal combustion engine 1, a layer formed of a mixture of fuel and air is formed (stratified) in the vicinity of the ignition plug 7 as separated from an air layer in the circumference of the mixture layer, and therefore, it is possible to perform stable stratified combustion with an extremely lean mixture. It should be noted that the internal combustion engine 1 of the present embodiment is explained as what you called a direct injection engine, but not limited thereto, may be applied to an internal combustion engine of an intake manifold (intake port) injection type without mentioning.

Each ignition plug 7, the throttle valve 10, each injector 12, the valve operating mechanism and the like as described above are electrically connected to an ECU 20 which acts as a control apparatus of the internal combustion engine 1. The ECU 20 includes a CPU, a ROM, a RAM, an input and an output port, a memory apparatus and the like (any of them is not shown). Various types of sensors including a crank angle sensor 14 of the internal combustion engine 1 are, as shown in FIG. 3, connected electrically to the ECU 20. The ECU 20 uses various types of maps stored in the memory apparatus and also controls the ignition plugs 7, the throttle valve 10, the injectors 12, the valve operating mechanism and the like for a desired output based upon detection values of the various types of sensors or the like.

In addition, the internal combustion engine 1 includes in-cylinder pressure sensors 15 (in-cylinder pressure detecting means) the number of which corresponds to the number of the cylinders, each provided with a semiconductor element, a piezoelectric element, a fiber optical sensing element and the like. Each in-cylinder pressure sensor 15 is disposed in the cylinder head in such a way that the pressure-receiving face thereof is exposed to the associated combustion chamber 3 and is electrically connected to the ECU 20. Each in-cylinder pressure sensor 15 detects an in-cylinder pressure in the associated combustion chamber 3 to supply a signal showing the detection value to the ECU 20.

Next, operations of the internal combustion engine 1 will be explained with reference to FIG. 4.

Figure 4:
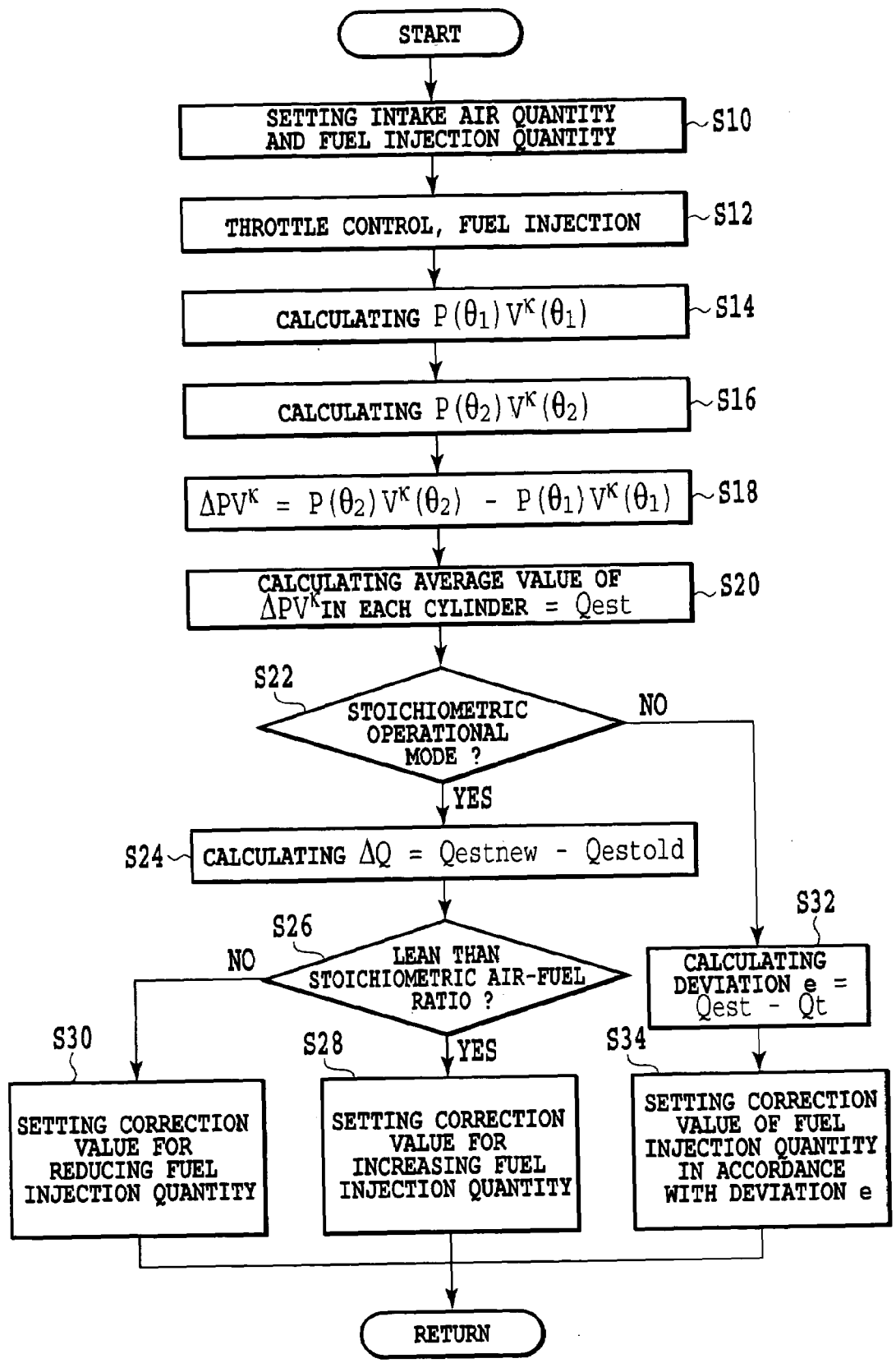
FIG. 4 is a flow chart for explaining operations of the internal combustion engine in FIG. 3.

When the internal combustion engine 1 is started and thereafter, is transferred from an idling state to an idling-off state, as shown in FIG. 4, the ECU 20 determines a target torque of the internal combustion engine 1 based upon a signal from a position sensor (not shown) for an accelerator pedal or the like and sets an intake air quantity (the opening of the throttle valve 10) and a fuel injection quantity (fuel injection time) from each injector 12 in accordance with the target torque by using a map or the like in advance prepared (step S10). Further, at step S12, the ECU 20 sets the opening of the throttle valve 10 to the opening thereof set at step S10, as well as injects, for example, a quantity of fuel set during an intake stroke of the engine at step S10 from each injector 12.

In addition, the ECU 20 monitors a crank angle of the internal combustion engine 1 based upon a signal from the crank angle sensor 14. And the ECU 20, after each intake valve Vi opens and at the same time when the crank angle becomes first timing (the timing when the crank angle becomes $\theta1$) set before ignition of each ignition plug 7, determines an in-cylinder pressure P ($\theta1$) in each combustion chamber 3 at the time when the crank angle becomes $\theta1$, based upon a signal from the in-cylinder pressure sensor 15. Further, the ECU 20 calculates a control parameter P ($\theta1$)·$V^\kappa$ ($\theta1$) in each combustion chamber 3 which is a product of the determined in-cylinder pressure P ($\theta1$) and a value obtained by exponentiating an in-cylinder volume V ($\theta1$) at the timing of detecting the in-cylinder pressure P ($\theta1$), i.e. at the time the crank angle becomes ($\theta1$) with a ratio $\kappa$ ($\kappa=1.32$ in the present embodiment) of specific heat, and stores the calculated control parameter P ($\theta1$)·$V^\kappa$ ($\theta1$) in a predetermined region of the RAM (step S14).

It is preferable that the first timing is set as the timing sufficiently earlier prior to the time (ignition time) when combustion starts in each combustion chamber 3. In the present embodiment, the first timing is set as, for example, the timing when the crank angle shown in the signal from the crank angle sensor 14 becomes $-60°$ ($\theta1=-60°$, i.e. $60°$ before a top dead center). In addition, a value of $V^\kappa$ ($\theta1$) (a value of $V^\kappa$ ($-60°$) in the present embodiment) is in advance calculated and is stored in the memory apparatus.

The ECU 20, after the processing of step S14, determines an in-cylinder pressure of P ($\theta2$) in each combustion chamber 3 at the time when the crank angle becomes $\theta2$, based upon a signal from the in-cylinder pressure sensor 15 at a second timing (the timing when the crank angle becomes $\theta2$) set after ignition of each ignition plug 7, as well as before the opening of each exhaust valve Ve. Further, the ECU 20 calculates a control parameter P ($\theta2$)·$V^\kappa$ ($\theta2$) in each combustion chamber 3 which is a product of the determined in-cylinder pressure P ($\theta2$) and a value obtained by exponentiating an in-cylinder volume V ($\theta2$) at the timing of detecting the in-cylinder pressure P ($\theta2$), i.e. at the time the crank angle becomes ($\theta2$) with a ratio $\kappa$ ($\kappa=1.32$ in the present embodiment) of specific heat, and stores the calculated control parameter P ($\theta2$) $V^\kappa$ ($\theta2$) in a predetermined region of the RAM (step S16). It is preferable that the second timing is set as the timing when combustion of a mixture in the combustion chamber 3 is substantially completed. In the present embodiment, the second timing is set as, for example, the timing when the crank angle shown in the signal from the crank angle sensor 14 becomes $90°$ ($\theta1=90°$, i.e. $90°$ after a top dead center). In addition, a value of $V^\kappa$ ($\theta2$) (a value of $V^\kappa$ ($90°$) in the present embodiment) is in advance calculated and then is stored in the memory apparatus.

As described above, when the control parameter P ($\theta1$)·$V^\kappa$ ($\theta1$) and P ($\theta2$)·$V^\kappa$ ($\theta2$) is determined, the ECU 20 calculates a difference in the control parameter $PV^\kappa$ between the first and the second timing in each combustion chamber 3 as $\Delta V^\kappa = P(\theta2)\cdot V^\kappa(\theta2) - P(\theta1)\cdot V^\kappa(\theta1)$, and stores the calculated difference in a predetermined memory region of the RAM (step S18). This difference $\Delta PV^\kappa$, as described above, shows heat production $\int dQ$ in each combustion chamber 3 between the second timing and the first timing (the two predetermined points), i.e. a heat quantity generated in the combustion chamber 3 during the period from the first timing to the second timing. When the difference $\Delta PV^\kappa$ of the control parameter $PV^\kappa$ is determined in each combustion chamber 3, the ECU 20 calculates an average value Qest (=Qestnew) of the difference $\Delta PV^\kappa$ of the control parameter $PV^\kappa$ for every combustion chamber 3 and stores the average value in a predetermined memory region of the RAM (step S20). Averaging thus the difference $\Delta PV^\kappa$ for every combustion chamber 3 allows the effect due to combustion variations between the combustion chambers 3 on the subsequent processing to be alleviated.

The average value Qest of the difference $\Delta PV^\kappa$ in the control parameter $PV^\kappa$ properly reflecting the heat production between the first timing and the second timing is simply and quickly calculated by the processing from step S14 to step S20 as described above. This causes significant reduction of calculation loads in the ECU 20 as compared to a case of calculating heat production in each combustion chamber 3 by performing the integral processing of the in-cylinder pressure for each minute unit crank angle.

When the processing at step S20 is completed, the ECU 20 determines in which operational mode the internal combustion engine 1 should be operated at this stage (step S22). The internal combustion engine 1 according to the present embodiment can be operated at any one of a stoichiometric operational mode in which an air-fuel ratio of a mixture of fuel and air in each combustion chamber 3 is set to a stoichiometric air-fuel ratio (fuel to air =1 to 14.7) and a lean operational mode in which an air-fuel ratio of a mixture of fuel and air in each combustion chamber 3 is set to a desired target air-fuel ratio larger than a stoichiometrical air-fuel ratio. And at step S22, the ECU 20 determines whether or not a stoichiometric operational mode is executed based parameters such as rotational speeds, loads, throttle openings, and depressing acceleration of an accelerator pedal.

When at step S22, it is determined that the stoichiometric operational mode should be executed, the ECU 20 calculates a deviation $\Delta Q$ between an average value Qestnew of the difference $\Delta PV^\kappa$ of the control parameter $PV^\kappa$ calculated at step S20 following this time's ignition in each combustion chamber 3 and an average value Qestold of the difference $\Delta PV^\kappa$ of the control parameter $PV^\kappa$ calculated at step S20 following the previous ignition in each combustion chamber 3 as $\Delta Q$=Qestnew−Qestold (step S24).

As herein explained in association with FIG. 2, when an air-fuel ratio of a mixture is small than a stoichiometric air-fuel ratio (a case of a rich region), a change (rate) of heat production $\int dQ$ between two predetermined points is extremely small as compared to a lean region. On the other hand, when an air-fuel ratio of a mixture in the combustion chamber 3 enters into a lean region exceeding a stoichiometric air-fuel ratio, the heat production $\int dQ$ rapidly reduces generally in proportion to the air-fuel ratio. Accordingly, if the deviation $\Delta Q$ (inclination of the heat production in FIG. 2) between this time's calculation value Qestnew and the previous calculation value Qestold of the difference $\Delta PV^\kappa$ in the control parameter $PV^\kappa$ between the two predetermined points showing the heat production $\int dQ$ is maintained in the vicinity of a predetermined value (within a predetermined range), the heat production $\int dQ$ between the two predetermined points is substantially constant after and before one time's ignition and the air-fuel ratio of the mixture is also substantially constant.

Therefore, when the ECU 20 determines the deviation $\Delta Q$ at step S24, the ECU 20 compares the deviation $\Delta Q$ with a predetermined threshold value a (negative predetermined value), thus determining whether or not an air-fuel ratio of the mixture in each combustion chamber 3 is larger than a stoichiometric air-fuel ratio (is lean)(step S26). In a case the ECU 20 determines that the mixture in each combustion chamber 3 is lean (the deviation $\Delta Q$ is less than the threshold value a) at step S26, the ECU 20 sets a correction value of a fuel injection quantity so that the fuel injection quantity from each injector 12 is slightly increased (step S28). Accordingly, even if the air-fuel ratio of the mixture in each combustion chamber 3 during the stoichiometric operational mode is larger than the stoichiometric air-fuel ratio, it is possible to make the air-fuel ratio of the mixture in each combustion chamber 3 be close to the stoichiometric air-fuel ratio by making the mixture in each combustion chamber 3 be rich.

In addition, in a case at step S26, the ECU 20 determines that the mixture in each combustion chamber 3 does not become lean, the air-fuel ration of the mixture in each combustion chamber 3 is assumed to be smaller than the stoichiometric air-fuel ratio (to be rich) to set a correction value of a fuel injection quantity so that the fuel injection quantity from each injector 12 is slightly reduced as needed (step S30). Accordingly, even if the air-fuel ratio of the mixture in each combustion chamber 3 during the stoichiometric operational mode is smaller than the stoichiometric air-fuel ratio, it is possible to make the air-fuel ratio of the mixture in each combustion chamber 3 be close to the stoichiometric air-fuel ratio by making the mixture in each combustion chamber 3 be lean. It should be noted that in the present embodiment, the correction value of the fuel injection quantity set at each of steps S28 and S30 is a predetermined constant quantity and may be calculated in accordance with a difference between the deviation $\Delta Q$ and the threshold value.

On the other hand, in a case it is determined that at step S22, the stoichiometric operational mode should not be executed, that is, the lean operational mode should be executed, the ECU 20 reads out a target value Qt of heat production in accordance with a target air-fuel ratio in the lean operational mode from the memory apparatus, as well as calculates a deviation e between the average value Qest of the difference $\Delta PV^\kappa$ in the control parameter $PV^\kappa$ determined at step S20 and a target value Qt as e=Qest−Qt (step S32). In addition, the ECU 20 calculates (sets) a correction value of a fuel injection quantity so that the deviation e determined at step S32 is made to be zero by using a map in advance prepared or a predetermined function expression (step S34).

As explained herein in association with FIG. 2, when an air-fuel ratio of the mixture in each combustion chamber 3 becomes larger than a stoichiometric air-fuel ratio (becomes lean), the heat production $\int dQ$ between the two predetermined points reduces generally in proportion to the air-fuel ratio to a rapid changing point (lean limit point) prior to flameout as the air-fuel ratio increases. Accordingly, in the region (lean region) where the air-fuel ratio of the mixture is larger than a stoichiometric air fuel ratio, the deviation e between the average value Qest of the difference $\Delta PV^\kappa$ in the control parameter $PV^\kappa$ between the two predetermined points determined at step S20 and the target value Qt is made to be zero, thereby making it possible to maintain an air-fuel ration of the mixture in each combustion chamber 3 to be a desired (lean) target air-fuel ratio larger than a stoichiometric air-fuel ratio. That is, in the internal combustion engine 1, a feedback control is performed for making the average value Qest of the difference $\Delta PV^\kappa$ in the control parameter $PV^\kappa$ be close to the target value Qt at a lean operational mode. Thereby, in the internal combustion engine 1, it is possible to make the mixture in each combustion chamber 3 be as lean as possible to the vicinity of the lean limit region in FIG. 2, i.e. it is possible to carry out a lean limit operation by properly setting the target value Qt of the heat production therein.

As described above, the ECU 20 sets a correction value of a fuel injection quantity at step S28 or S30 in the event of a stoichiometric operational mode, and a correction value of a fuel injection quantity at step S34 in the event of a lean operational mode. And the ECU 20 goes back to step S10, wherein a fuel injection quantity (fuel injection time) from each injector 12 is set considering (adding/subtracting) the correction value of the fuel injection quantity set at step S28, S30 or S34, as well as the opening of the throttle valve 10 is set to repeatedly execute the processing after the step S12. Such a series of the processing is repeated by the ECU 20 during the period when an idling-off state continues.

As explained above, since according to the internal combustion engine 1, in the event of a stoichiometric operational mode, an air-fuel ratio of a mixture in each combustion chamber 3 is set accurately in the vicinity of a stoichiometric air-fuel ratio by using a difference $\Delta PV^\kappa$ in the control parameter $PV^\kappa$ roperly reflecting heat production between the two predetermined points, the region where a ratio $\lambda$ of a supply air quantity to a astoichiometric air-fuel ratio is equal to 1 ($\lambda$=1) can be expanded. In addition, according to the internal combustion engine 1, in the event of a lean operational mode, an air-fuel ratio of a mixture in each combustion chamber 3 is set accurately to a predetermined target air-fuel ratio larger than a stoichiometric air-fuel ratio by using a difference $\Delta PV^\kappa$ in control parameter $PV^\kappa$ properly reflecting heat production between the two predetermined points.

In this way, an air-fuel ratio control in the internal combustion engine 1 is performed by using a difference $\Delta PV^\kappa$ in control parameter $PV^\kappa$ properly reflecting heat production between two predetermined points and thereby, it is possible to resolve problems with what you called a detection delay or a transport lag recognized in a case an in-cylinder air-fuel ratio is controlled (feedback-controlled) based upon, for example, an exhaust air-fuel ratio detected in an exhaust system for an internal combustion engine, significantly improving response and accuracy in an air-fuel ratio control. In addition, as described above, since a highly accurate air-fuel ratio control is performed by using a difference $\Delta PV^\kappa$ in control parameter $PV^\kappa$, it is possible to omit an air-fuel ratio sensor for detecting an exhaust air-fuel ratio, an air-flow meter for detecting an intake air quantity and the like, which are absolutely necessary for the conventional air-fuel ratio control, leading to enabling the construction of the internal combustion engine 1 at low costs. In addition, realization of the highly accurate air-fuel ratio causes purification loads on a catalyst to be reduced, thereby enabling downsizing of a catalyst apparatus.

It should be noted that a control quantity for correcting an air-fuel ratio of a mixture in each combustion chamber 3 is not limited to a correction value of a fuel injection quantity, but may be a correction value of a throttle valve, a correction value of an exhaust gas recirculation quantity in an internal combustion engine provided with an exhaust gas recirculation system or a combination thereof. That is, in the processing at steps S28, S30 and S34, when at least any one of correction values of a fuel injection quantity, an opening of a throttle valve, an exhaust gas recirculation quantity, and the like is set, it allows correcting an air-fuel ratio of a mixture in each combustion chamber 3. Further, the present invention can be applied not only to a gasoline engine but also to a diesel engine without mentioning.

In addition, if a map or the like defining a relation between a value Qest showing actual heat production and an air-fuel ratio (actual air-fuel ratio) of a mixture in each combustion chamber 3 is in advance prepared on a basis that the air-fuel ratio of the mixture in each combustion chamber 3 in a lean region is generally in proportion to heat production Q (refer to FIG. 2), the actual air-fuel ratio in accordance with the Qest can be calculated from the map or the like. Accordingly, at steps S32 and S34 in FIG. 4, the actual air-fuel ratio in accordance with the Qest showing the actual heat production is calculated, as well as a deviation between the calculated air-fuel ratio and a target air-fuel ratio set in accordance with an engine rotational speed and an engine load is determined, and a control quantity (for example, the correction of the fuel injection quantity) for correcting the air-fuel ratio of the mixture in each combustion chamber 3 may be set in accordance with the determined deviation. When the control parameter $PV^\kappa$ is thus used, it is possible to accurately detect the air-fuel ratio in the internal combustion engine 1.

INDUSTRIAL APPLICABILITY

The present invention is useful in a control apparatus and a control method for an internal combustion engine with practicability which is simply able to perform a highly accurate engine control at low loads.

The invention claimed is:

1. A control apparatus for an internal combustion engine which generates power by burning a mixture of fuel and air in a cylinder thereof, comprising:
   in-cylinder pressure detecting means;
   calculating means for calculating a control parameter based upon the in-cylinder pressure detected by the in-cylinder pressure detecting means and an in-cylinder volume at a timing of detecting the in-cylinder pressure; and
   control means for setting a predetermined control quantity based upon the control parameter calculated by the calculating means,
   wherein the control parameter includes a product of the in-cylinder pressure detected by the in-cylinder pressure detecting means and a value obtained by exponentiating the in-cylinder volume at the timing of detecting the in-cylinder pressure with a predetermined index.

2. The control apparatus for the internal combustion engine according to claim 1, wherein:
   the calculating means calculates the control parameters at two predetermined points; and
   the control means sets a predetermined control quantity based upon a difference in the control parameter between the two predetermined points.

3. The control apparatus for the internal combustion engine according to claim 2, wherein:
   one of the two predetermined points is set as a point after the opening of an intake valve and before the combustion starting of the mixture; and
   the other is set as a point after the combustion starting and before the opening of an exhaust valve.

4. The control apparatus for the internal combustion engine according to claim 2, wherein:
   the control means determines a deviation between the difference in the control parameter calculated previously and the difference in the control parameter calculated at this time on a predetermined condition and sets a control quantity for correcting an air-fuel ratio of the mixture based upon the determined deviation.

5. The control apparatus for the internal combustion engine according to claim 2, wherein:
   The control means sets a control quantity for correcting an air-fuel ratio of the mixture so that the difference in the control parameter is equal to a target value on a predetermined condition.

6. A control method for an internal combustion engine which generates power by burning a mixture of fuel and air, comprising the steps of:
   (a) detecting an in-cylinder pressure; (b) calculating a control parameter based upon the in-cylinder pressure detected in the step (a) and an in-cylinder volume at a timing of detecting the in-cylinder pressure; and
   (c) setting a predetermined control quantity based upon the control parameter calculated in the step (b),
   wherein the control parameter includes a product of the in-cylinder pressure detected in the step (a) and a value obtained by exponentiating the in-cylinder volume at the timing of detecting the in-cylinder pressure with a predetermined index.

7. The control method for the internal combustion engine according to claim 6, wherein:
   in the step (b), the control parameters are calculated at two predetermined points; and
   in the step (c), a predetermined control quantity is set based upon a difference in the control parameter between the two predetermined points.

8. The control method for the internal combustion engine according to claim 7, wherein:
   one of the two predetermined points is set as a point after the opening of an intake valve and before the combustion starting of the mixture and the other is set as a point after the combustion starting and before the opening of an exhaust valve.

9. The control method for the internal combustion engine according to claim 7, wherein:
   the step (c) includes the steps of:
   determining a deviation between the difference in the control parameter calculated previously and the difference in the control parameter calculated at this time on a predetermined condition; and
   setting a control quantity for correcting an air-fuel ratio of the mixture based upon the determined deviation.

10. The control method for the internal combustion engine according to claim 7, wherein:
    the step (c) includes the step of:
    setting a control quantity for correcting an air-fuel ratio of the mixture so that the difference in the control parameter is equal to a target value on a predetermined condition.

* * * * *